(12) United States Patent
Okuda et al.

(10) Patent No.: US 8,256,071 B2
(45) Date of Patent: Sep. 4, 2012

(54) MAIN BODY HOLDER FOR PORTABLE APPARATUS AND PORTABLE APPARATUS INCLUDING MAIN BODY HOLDER

(75) Inventors: Hideki Okuda, Chiba (JP); Teruo Kato, Chiba (JP); Dai Terasawa, Chiba (JP)

(73) Assignee: Seiko Instruments Inc. (JP)

( * ) Notice: Subject to any disclaimer, the term of this patent is extended or adjusted under 35 U.S.C. 154(b) by 915 days.

(21) Appl. No.: 12/286,864

(22) Filed: Oct. 2, 2008

(65) Prior Publication Data

US 2009/0094806 A1   Apr. 16, 2009

(30) Foreign Application Priority Data

Oct. 3, 2007  (JP) ................................ 2007-259935

(51) Int. Cl.
*A44C 25/00* (2006.01)
(52) U.S. Cl. ...................................................... 24/517
(58) Field of Classification Search .............. 24/517, 24/499, 500, 3.11, 3.12, 509, 510; 224/666–669, 224/690–692, 198, 271, 929, 930, 245; 220/482
See application file for complete search history.

(56) References Cited

U.S. PATENT DOCUMENTS

| | | | | |
|---|---|---|---|---|
| 5,261,583 A * | 11/1993 | Long et al. | ...................... | 224/245 |
| 6,149,043 A * | 11/2000 | Goto | .............................. | 224/669 |
| 6,752,299 B2 * | 6/2004 | Shetler et al. | .................. | 224/197 |
| 6,955,279 B1 * | 10/2005 | Mudd et al. | ..................... | 224/197 |
| 7,409,237 B2 * | 8/2008 | Tages | .......................... | 455/575.1 |
| 7,458,489 B1 * | 12/2008 | Mudd et al. | ..................... | 224/197 |
| 7,513,472 B2 * | 4/2009 | Yang | ......................... | 248/231.81 |
| 2007/0057004 A1 * | 3/2007 | Butler et al. | .................. | 224/669 |

FOREIGN PATENT DOCUMENTS

JP   2003153720   5/2003

* cited by examiner

*Primary Examiner* — Victor Batson
*Assistant Examiner* — Matthew Sullivan
(74) *Attorney, Agent, or Firm* — Adams & Wilks

(57) ABSTRACT

A main body holder has a base wall with a through-hole, a holding portion, and a pivotally attached clip piece. A stopper member is movably disposed within the base wall through-hole for movement between a restricting position and a releasing position. In the restricting position, the stopper member projects from the base wall and is configured to engage and securely hold the main body of a portable apparatus on the holding portion so that the apparatus main body is only partially disposed over the base wall through-hole in a state in which the apparatus main body is fully received by the holding portion. In the releasing position, the stopper member extends into the through-hole and does not project from the base wall so that the apparatus main body is allowed to be slid relative to the holding portion. An urging member urges the clip piece into contact with the holding portion and urges the stopper member to the restricting position.

27 Claims, 8 Drawing Sheets

MAIN BODY HOLDER FOR PORTABLE APPARATUS AND PORTABLE APPARATUS INCLUDING MAIN BODY HOLDER

BACKGROUND OF THE INVENTION

1. Field of the Invention

The present invention relates to a portable apparatus including an apparatus main body holder for attachably and detachably holding an apparatus main body of a portable type, for example, a pedometer, a portable type game machine, an audio player, a portable telephone or the like, and an apparatus main body holder for mounting an apparatus main body of a portable type attachably and detachably to a mounted object, for example, a clothing, a belt, a bag or the like of a person carrying the object.

2. Description of the Related Art

There is known a holder clip including a holder main body including a holding portion, a stopper piece, a clip piece, a first coil spring, and a second coil spring for insertably and detachably holding a portable apparatus (refer to, for example, Patent Reference 1).

The holder main body includes the holding portion insertably and detachably fitted with a portable apparatus, and a back face plate forming a back face of the holding portion, and extended from an opening of the holding portion along a direction of inserting and detaching the portable apparatus. The stopper piece is pivotably supported at the back face plate by a pin. One end portion of the stopper piece deviated from the holding portion is formed with an engaging piece and a pivoting shaft is provided between the engaging piece and the pin. The engaging piece is provided by avoiding the back face plate and is engaged with and disengaged from a hole of the portable apparatus. The clip piece covers the stopper piece from a back face side and pivotably supported by the pivoting shaft. The clip piece includes a projected portion capable of pressing other end portion (front end portion) of the stopper piece disposed on a side of the holding portion.

The first coil spring and the second coil spring are attached to the pivoting shaft. The first coil spring urges a front end portion of the clip piece to the back face plate, thereby, the projected portion of the clip piece presses other end portion of the stopper piece. The second coil spring urges the front end portion of the stopper piece to the back face plate, thereby, the engaging piece of the stopper piece is arranged at a position of being engaged with the hole of the portable apparatus. An urge force of the first coil spring is larger than an urge force of the second coil spring.

By the foregoing urge forces, in a state of not holding the portable piece, the clip piece presses the front end portion of the stopper piece by the projected portion by the force of the second coil spring, and therefore, the engaging piece of the stopper piece is escaped to a position of not hampering the portable apparatus from being inserted to and detached from the holding portion. Further, by pinching a mounted object between the clip piece and the back face plate by pivoting the clip piece after fitting the portable apparatus to the holding portion, the stopper piece is pivoted by the force of the first coil spring and the engaging piece is engaged with the hole of the portable apparatus. Thereby, the holder clip of Patent Reference 1 can hold the portable apparatus at the holder main body.

The holder clip of Patent Reference 1 is separately provided with the coil spring for urging the clip piece to the back face plate of the holder main body and pinching the mounted object therebetween, and the coil spring for urging the stopper piece and engaging the engaging piece with the hole of the portable apparatus. Therefore, the holder clip of Patent Reference 1 has a large number of parts, and its construction and integration are complicated.

Further, in a state in which the holder clip of Patent Reference 1 is not mounted to the mounted object, the engaging piece of the stopper piece is escaped to the position of not hampering the portable apparatus from being inserted to and detached from the holding portion. Therefore, in the non-mounted state, the portable apparatus cannot be held so as not to detach from the holding portion of the holder main body.

Further, according to the holder clip of Patent Reference 1, a depth of engaging the engaging piece of the stopper piece with the hole of the portable apparatus main body depends on a thickness of the mounted object pinched by the clip piece and the back face plate of the holder main body. Therefore, when the mounted object is thin, a reliability of holding the portable apparatus by the engaging piece is deteriorated and there is a concern that the portable apparatus may become detached from the holder main body.

[Patent Reference 1] JP-A-2003-153720 (paragraphs 0011-0041, FIG. 1-FIG. 6)

SUMMARY OF THE INVENTION

It is an object of the invention to provide an apparatus main body holder of a portable apparatus having a simple construction and having a high reliability of holding the apparatus main body in a state of being attached to the mounted object and in a state of not being mounted to the mounted object, and a portable apparatus including the apparatus main body holder.

An apparatus main body holder of a portable apparatus of the invention is that an apparatus main body holder of a portable apparatus holding an apparatus main body attachably and detachably to and from the portable apparatus, the apparatus main body holder including a holder main body having a base wall, and a holding portion provided on a surface side of the base wall for holding the apparatus main body inserted to and detached from the base wall to slide along a surface of the base wall, a clip piece pivotably attached to the holder main body, stopper means provided movably over a restricting position of preventing the apparatus main body held by the holding portion from being drawn out from the holding portion in a direction reverse to a direction of being inserted to the holding portion, and a releasing position for releasing the restriction, and an urging member for urging the clip piece to be brought into contact with the holder main body and arranging the stopper means at the restricting position by urging the stopper means.

Although according to the invention, the holder main body is preferably formed by a hard synthetic resin, the holder main body can also be made by a metal and can be made by an elastic material of a synthetic resin or the like having an elasticity of polyurethane resin or the like.

According to the invention, the holding portion of the holder main body comprises a cylindrical portion fitted with the apparatus main body of the portable apparatus along with the base wall and providing a portion for rectifying a depth of fitting the apparatus main body to the cylindrical portion at an end portion of the cylindrical portion other than a holding portion explained in an embodiment described later. Alternatively, the holding portion includes a pair of holding walls forming a section in an L-like shape having portions covered to edges of a surface of the apparatus main body on a side opposed to a back face opposed to the base wall of the apparatus main body, and a portion for rectifying a depth of fitting the apparatus main body between the holding walls. When the holding portions are adopted, there is achieved an advantage of not needing the engaging groove or the like for engaging with the holding portion at the apparatus main body. According to the invention, the holding portion may contain a total of the apparatus main body of the portable apparatus, or may hold the apparatus main body by covering a portion of the apparatus main body.

According to the invention, the clip piece can be provided at a position deviated from the base wall, for example, an outer face of the holding portion other than providing the clip piece at the back face of the base wall as explained in en embodiment described later, in this case, the clip piece is attached pivotably to, for example, an outer face of the holding portion.

According to the invention, in order to promote a function of pinching a mounted object of a clothing or the like, it is preferable that the holder main body and the clip piece are provided with recesses and projections brought in mesh with the mounted object to deform the mounted object in a zigzag shape.

According to the invention, it is not necessarily needed that the stopper means is engaged with the engaged portion of the apparatus main body at the restricting position, and a more or less clearance can also be provided. According to the invention, it is preferable to utilize a one side face disposed in a direction of inserting and detaching the apparatus main body to and from the holding portion as the engaged portion, in details, the stopper means may preferably be engaged with and detached from the side face of the apparatus main body disposed on a rear side in a direction of inserting the apparatus main body to the holding portion. A way of engaging the stopper means with the one side face of the mode differs by a position of the clip piece. For example, when the clip piece is provided at the base wall, the stopper means can be engaged with and disengaged from the one side face by making the stopper means come to and go away from the base wall, further, when the clip piece is provided at an outer face of the holding portion, the stopper means can be engaged with and disengaged from the one side face by making the stopper means come to and go away from, for example, the side wall of the holding portion orthogonal to the base wall.

According to the invention, the stopper means may not be provided with an operating portion for detaching the stopper means from the engaged portion of the apparatus main body. When the stopper means is provided with an operating portion separate from the engaging portion engaged with or proximate to the engaged portion of the apparatus main body to be opposed, the operating portion can be provided as a lever continuous from the engaging portion and projected in, for example, a side direction of the holder main body. Although the stopper means includes the engaging portion engaged with or proximate to the one side face (engaged portion) of the apparatus main body to be opposed, when there is not the operating portion separate therefrom, the engaging portion can be engaged with and disengaged from the one side face by pushing to move the engaging portion as the operating portion.

Although according to the invention, as the urging member, a torsional coil spring can preferably be used, the invention is not restricted thereto. For example, a general coil spring or leaf spring or the like can be used, and an elastic member of a synthetic rubber or the like can also be used. Further, when the urging member is a spring, the spring can be formed by a metal or a synthetic resin.

According to the apparatus main body holder of a portable apparatus of the invention, the urging member urges or biases both the clip piece and the stopper means, and therefore, exclusive urging members for these respective parts are not needed, and a number of parts for the main body holder is reduced and its construction can be simplified.

Further, according to the apparatus main body holder of a portable apparatus of the invention, the stopper means is arranged at the restricting position by urging by the urging member, and an urge force of the urging member for the stopper means is not smaller than an urge force in a state of not pinching the mounted object by the holder main body and the clip piece. Therefore, even in a state in which the apparatus main body holder is not mounted to the mounted object, the apparatus main body of the portable apparatus can be held with a high reliability so as not to be detached from the holding portion.

Along therewith, according to the apparatus main body holder of a portable apparatus of the invention, when the holder main body and the clip piece pinch the mounted object, the urge force of the urging member is increased regardless of a thickness of the mounted object. Thereby, the stopper means can be arranged properly at the restricting position regardless of the thickness of the mounted object. Therefore, the apparatus main body of the portable apparatus can be held with a high reliability so as not to be detached from the holding portion.

A preferable embodiment of the apparatus main body holder of a portable apparatus of the invention is that the stopper means is engageable and disengageable with and from an engaged portion provided to the apparatus main body held by the holding portion and the stopper means is caught by the engaged portion from a rear side in a direction of inserting the apparatus main body to the holding portion.

In the preferable mode, when the apparatus main body includes the engaged portion of a hole, a stepped portion or the like, the stopper means is engaged with and disengage from the engaged portion, further, when the side face of the apparatus main body disposed in the direction of inserting and detaching the apparatus main body to and from the holding portion is utilized as the engaged portion, in details, the stopper means can be engaged with and disengaged from the side face of the apparatus main body disposed on the rear side in the direction of inserting the apparatus main body to the holding portion.

In the preferable mode, when the stopper means is disposed at the restricting position, the stopper means is engaged therewith in a state of being caught by the engaged portion of the apparatus main body inserted to the holding portion, and the engaging state is maintained by the urge force of the urging member. Therefore, a rattle in a direction of inserting and detaching the apparatus main body to and from the holding portion can be restrained.

A preferable embodiment of the apparatus main body holder of a portable apparatus of the invention is that the clip piece is arranged on a back side of the base wall, the stopper means is provided to come to and go away from a surface of the base wall, the urging member is arranged on a back side of the holder main body and the clip piece is urged to the back face of the holder main body by the urging member.

According to the preferable embodiment, an anticipated effect of the invention can be achieved by an operation the same as those of the respective inventions already explained.

A preferable embodiment of the apparatus main body holder of a portable apparatus of the invention is that the stopper means is formed by a part formed separately from the holder main body and the clip piece, and the stopper means is rotatably attached to the holder main body by way of a shaft.

According to the preferable embodiment of the invention, in comparison with a case of providing the stopper means integrally with the holder main body or the clip piece, the stopper means can be formed without being restricted by a material or a strength of the holder main body or the clip piece. In accordance therewith, the stopper means can be made by a material of a color different from that of the holder main body, in this case, an optical recognizing performance of the stopper means can be promoted. Further, the stopper means is pivoted centering on the shaft, and a reliability of an operation of a movement over the restricting position and the releasing position is high.

A preferable embodied of the apparatus main body holder of a portable apparatus of the invention is that the stopper means is integrally formed with the holder main body.

According to the preferable mode, the number of parts is further reduced and a constitution can further be simplified.

A preferable embodiment of the apparatus main body holder of a portable apparatus of the invention is that the stopper means is formed integrally with the clip piece.

According to the preferable mode, the number of parts is further reduced and the constitution can further be simplified.

A preferable embodiment of the apparatus main body holder of a portable apparatus of the invention is that the stopper means includes an engaging portion engaged and disengaged with and from a side face on a rear side in a direction of inserting the apparatus main body to the holding portion by coming out and going away to and from a surface of the base wall.

According to the preferable mode, the engaging portion of the stopper means is engaged with the side face on the rear side in the direction of inserting the apparatus main body by being arranged at the restricting position by being projected from the surface of the base wall. Therefore, a carrying person is easy to recognize the engaging portion, and therefore, an operability in a case of pushing to move the engaging portion to the releasing position is excellent. Further, according to the preferable embodiment, the side face on the rear side in the direction of inserting the apparatus main body is utilized as the engaged portion of the apparatus main body engaging the engaging portion at the restricting position, and therefore, it is not necessary to provide the engaged portion constituted by a hole, a stepped portion or the like particularly at the apparatus main body, which is preferable in not restricting a design of the apparatus main body.

A preferable embodiment of the apparatus main body holder of a portable apparatus of the invention is that the stopper means includes a pressing portion brought into contact with the back face of the apparatus main body.

According to the preferable mode, the end portion on the rear side in the direction of inserting the apparatus main body to the holding portion of the apparatus main body of the portable apparatus held by the holding portion can be urged from the back side of the apparatus main body to the surface side of the apparatus main body by the urge force of the urging member by way of the pressing portion of the stopper means. Therefore, the apparatus main body is pressed to the holding portion in the thickness direction, and therefore, the apparatus main body held by the holding portion can be restrained from being rattled in the thickness direction.

A preferable embodiment of the apparatus main body holder of a portable apparatus of the invention is that an end portion of the holder main body disposed on the rear side in the direction of inserting the apparatus main body to the holding portion forms a holder main body grabbing end portion surrounding a surrounding of the stopper means, and the holder main body grabbing end portion is provided with a through hole to and from which the engaging portion comes and goes away.

According to the preferable mode, the apparatus main body can be prevented from being detached unpreparedly from the holding portion by disengaging the engagement of the engaging portion and the apparatus main body in accordance with enabling the engaging portion of the means not to be brought into contact with other object unpreparedly by the holder main body grabbing end portion surrounding a surrounding of the stopper means. Further, when the clip piece is pivoted, the operation can be carried out by touching the finger to the clip piece and the holder main body grabbing end portion, and therefore, the clip piece can be restrained from being operated to pivot by touching the finger to the apparatus main body and the clip piece by the operation.

A preferable embodiment of the apparatus main body holder of a portable apparatus of the invention is that the holder main body grabbing end portion is formed by an end portion of the base wall, and a clip piece grabbing end portion provided to the clip piece is arranged on a back side of the holder main body grabbing end portion to be opposed to the holder main body grabbing end portion.

According to the preferable mode, when the clip piece is operated to pivot by touching the finger to the clip piece and the holder main body grabbing end portion, the finger is easy to be touched thereto, and therefore, the operation of pivoting the clip piece is easy.

Further, an apparatus main body holder of a portable apparatus of the invention is that an apparatus main body holder of a portable apparatus holding the apparatus main body attachably and detachably to and from the portable apparatus, the apparatus main body holder including holder main body having a base wall, and a holding portion provided on a surface side of the base wall for holding the apparatus main body inserted to and detached from the base wall to slide along a surface of the base wall, a clip piece pivotably attached to the holder main body, stopper means formed integrally to the holder main body, capable of moving the apparatus main body held by the holding portion over a restricting position of preventing the apparatus main body from being brought to the holding portion in a direction reverse to a direction of inserting the apparatus main body to the holding portion and a releasing position of releasing the restriction and arranged at the restricting position by a flexibility of the stopper means per se, and an urging member for urging the clip piece to be brought into contact with the holder main body.

According to the apparatus main body holder of a portable apparatus of the invention, the stopper means can be moved to the restricting position and the releasing position by a flexibility of its own, the urging member can be omitted for urging the stopper means to the restricting position, and therefore, only the urging member for urging the clip piece is needed. Exclusive urging members for respectively urging the stopper means and the clip piece in this way are not needed, and therefore, the number of parts is reduced and the constitution can be simplified.

Further, according to the apparatus main body holder of a portable apparatus of the invention, the urging force by the urging member is regardless of arranging the stopper means to the restricting position. Therefore, even in a state in which the apparatus main body holder is not mounted to the mounted object, the apparatus main body of the portable apparatus can be maintained with a high reliability so as not to be detached from the holding portion, regardless of the thickness of the mounted object, the stopper means can be arranged properly at the restricting position, and therefore, even in a state of mounting the apparatus main body holder to the mounted object, the apparatus main body of the portable apparatus can be held with a high reliability so as not to be detached from the holding portion.

Further, the portable apparatus of the invention is that an apparatus main body provided with an operating portion and a display on a surface thereof, and the apparatus main body holder according to any one of the respective inventions for insertably and detachably holding the apparatus main body.

According to the invention, there can be provided the portable apparatus including the apparatus main body holder of the portable apparatus having a simple constitution and having a high reliability of holding the apparatus main body in a state of being mounted to the mounted object and in state of not being mounted to the mounted object.

A preferable embodiment of the portable apparatus of the invention is that the operating portion and the display are exposed in a state of holding the apparatus main body at the holding portion of the apparatus main body holder.

According to the preferable embodiment, in a state of holding the apparatus main body at the holding portion, the operating portion of the apparatus main body can be operated and the display can optically be recognized. Further, the optical recognition can be realized by, for example, a constitution of holding the holding portion by a pair of holding side walls opposed to each other, further, when the holding portion includes a portion of covering the surface of the apparatus main body, optical recognition can be realized by a constitution of providing a window opposed to the display or the operating portion at the portion.

A preferable embodiment of the portable apparatus of the invention is that side faces of the apparatus main body in parallel with each other are provided with engaging grooves extended in a direction of being inserted to and detached from the apparatus main body holder, the holding portion is formed by a pair of holding side wall portions opposed to each other heights of which are made to be lower than a height of the side face of the apparatus main body, and a holding end wall spanning the holding side wall portions, and a projected streak engaged with the engaging groove is formed at the holding side wall portion.

According to the preferable embodiment, the holding side wall of the holding portion is not provided at the height larger than the thickness of the apparatus main body, and therefore, the thickness of the portable apparatus in the state of holding the apparatus main body of the apparatus main body holder can be thinned.

A preferable embodiment of the portable apparatus of the invention is that an end portion of the base wall provided to the apparatus main body holder disposed on a rear side in a direction of inserting the apparatus main body to the holding portion provided to the apparatus main body holder is formed with a holder main body grabbing end portion surrounding a surrounding of the engaging portion of the stopper means provided to the apparatus main body holder, and the holder main body grabbing end portion is provided with a through hole to and from which the engaging portion comes and goes away, and a clip piece grabbing end portion provided to the clip piece provided to the apparatus main body holder is arranged on a back side of the holder main body grabbing end portion to be opposed to the holder main body grabbing end portion.

According to the preferable mode, by the holder main body grabbing end portion surrounding the surrounding of the stopper means, the apparatus main body can be prevented from being detached unpreparedly from the holding portion by disengaging the engagement of the engaging portion and the apparatus main body in accordance with enabling the engaging portion of the means from being unpreparedly brought into contact with other article by the holder main body grabbing end portion surrounding the surrounding of the stopper means. Further, when the clip piece is pivoted, the operation is carried out by touching the finger to the clip piece and the holder main body grabbing end portion, and therefore, the clip piece can be restrained from being operated to pivot by touching the finger to the apparatus main body and the clip piece by the operation. Further, when the clip piece is operated to pivot by touching the finger to the clip piece and the holder main body grabbing end portion, the finger is easy to be touched thereto, and therefore, the pivoting operation of the clip piece is easy. Furthermore, in accordance with enabling the clip piece to be operated to pivot without touching the finger to the apparatus main body as described above, the display of the apparatus main body can be prevented from being stained by the finger, or the operating portion of the apparatus main body can be prevented from being operated erroneously.

According to the invention, there can be provided the apparatus main body holder of the portable apparatus and the portable apparatus including the apparatus main body holder having simple constitutions and achieving an effect in which a reliability of holding the apparatus main body in the state of mounting to the mounted object and in the state of not being mounted to the mounted object is high.

DETAILED DESCRIPTION OF THE PREFERRED EMBODIMENTS

A first embodiment of the invention will be explained in reference to FIG. 1 through FIG. 8.

Figure 1:
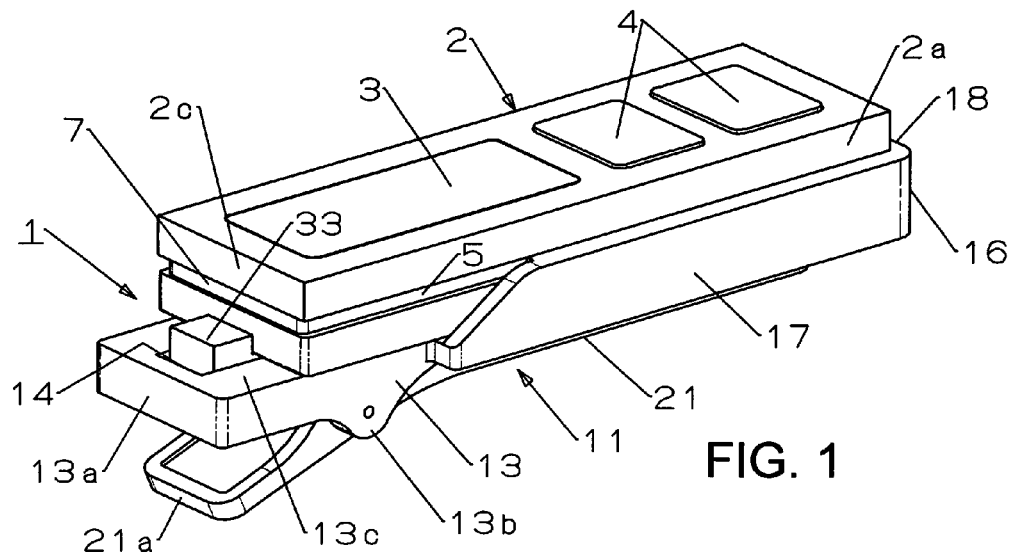
FIG. 1 is a perspective view showing a portable apparatus according to a first embodiment of the invention in a state of holding an apparatus main body thereof by an apparatus main body holder.
Figure 2:
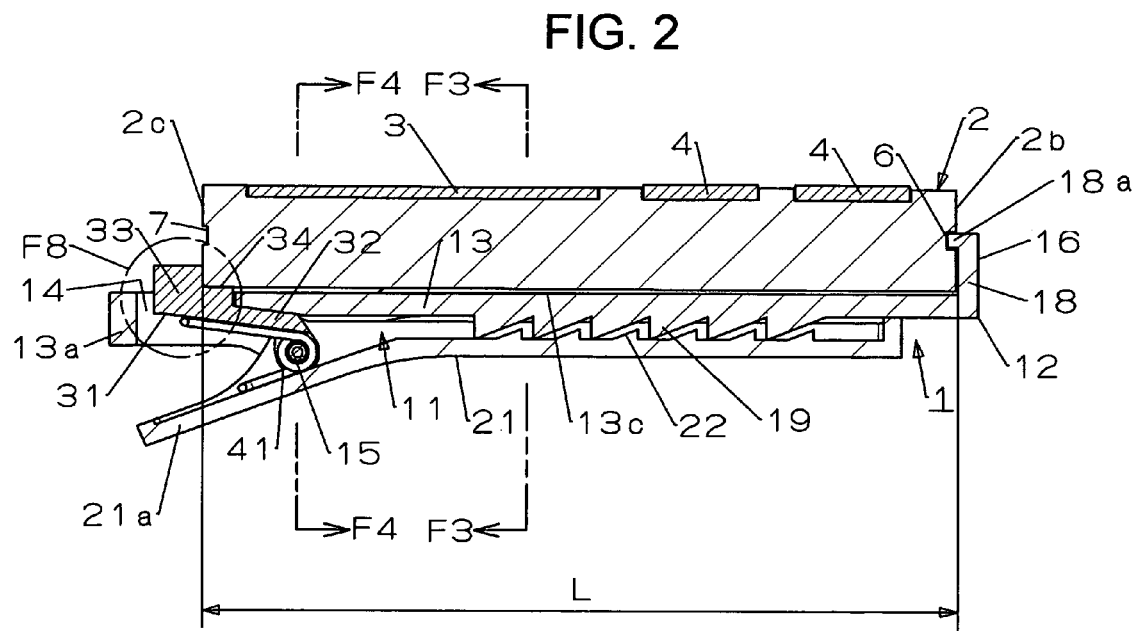
FIG. 2 is a sectional view showing the portable apparatus of FIG. 1.

In FIG. 1 and FIG. 2, notation 1 designates a portable apparatus, for example, a pedometer. The pedometer 1 is formed by including an apparatus main body 2 and an apparatus main body holder 11 (in the following, abbreviated as holder) for attachably and detachably holding the apparatus main body 2.

Although the apparatus main body 2 forms a main body of, for example, the pedometer 1 and can be used by itself, in a mode of being used while being carried, in the present embodiment the apparatus main body 2 is used by being held by the holder 11 generally for carrying convenience. The apparatus main body 2 is formed substantially in the shape of, for example, a parallelepiped, and contains parts (not illustrated) for achieving a function necessary for the pedometer 1, for example, an acceleration sensor, various electronic parts for processing and operating a signal of the sensor and storing an operation result, and a part or the like for controlling a display.

The apparatus main body 2 is provided with a display, for example, a display 3 using a liquid crystal, and a plurality of operating portions 4 for instructing switching of an input, starting and stopping to measure a step number or the like. The display 3 and the operating portions 4 are exposed at a surface of the apparatus main body 2. The operating portions 4 are of a touch type.

The apparatus main body 2 includes a pair of side faces 2a extended in a longitudinal direction thereof and in parallel with each other, a side face (the side face is referred to as one side face in order to facilitate identification as follows) 2b disposed at one end in the longitudinal direction, and a side face (the side face is referred to as other side face to facilitate identification as follows) 2c disposed at other end in the longitudinal direction. The one end face 2b and the other end face 2c are in parallel with each other.

Engaging grooves 5 are respectively provided at the pair of side faces 2a of the apparatus main body 2 at a height position of a middle in a thickness direction of the apparatus main body 2. The engaging grooves 5 are extended in a direction of inserting and detaching the apparatus main body 2 to and from the holder 11, in other words, over a total length of the side faces 2a. An engaging groove 6 is provided at the one end face 2b of the apparatus main body 2 and an engaging groove 7 is provided also at the other end face 2c of the apparatus main body 2 at the height position of the middle in the thickness direction of the apparatus main body 2. The engaging grooves 6, 7 are formed at the height the same as that of the engaging groove 5 and are respectively continuous to both ends in the longitudinal direction of the engaging grooves 5.

As shown by FIG. 2, the holder 11 is provided with a holder main body 12, a clip piece 21, stopper means, for example, a stopper member 31 (stopper means) and an urge (urging) member, for example, a torsional coil spring 41.

The holder main body 12 is a molded product of a synthetic resin and includes a base wall 13, a holding portion 16, and a main body side pinching portion 19.

The base wall 13 is formed to be longer than the total length of the apparatus main body 2 and a width along a direction orthogonal to the longitudinal direction is substantially the same as a width of the apparatus main body 2. One end in the longitudinal direction of the base wall 13 is constituted to be used as a holder main body grabbing end portion (hereinafter, abbreviated as grabbing end portion) 13a.

Figure 4:
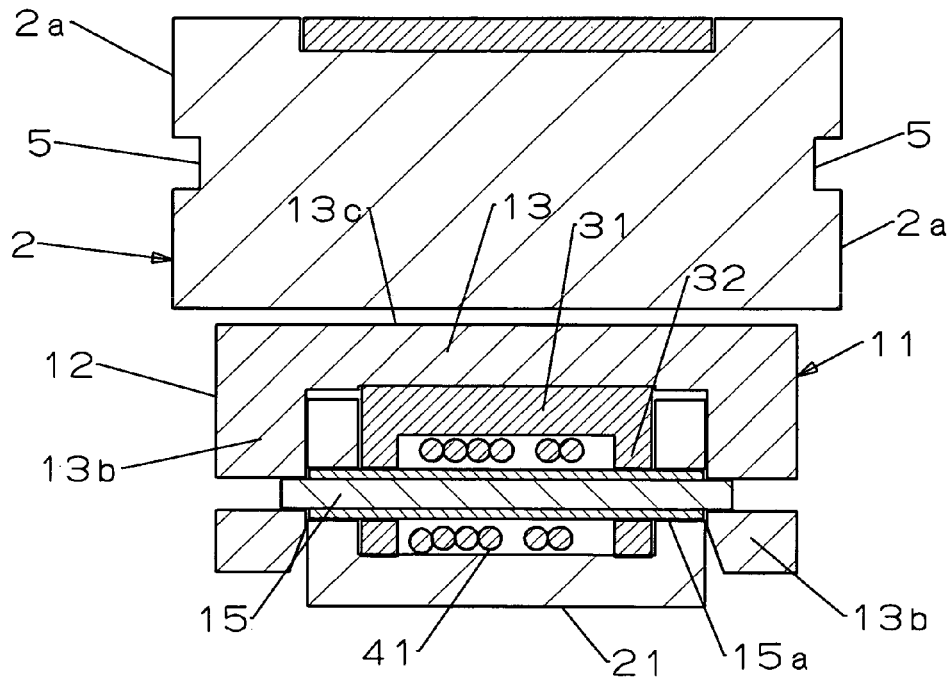
FIG. 4 is a sectional view of the portable apparatus taken along a line F4-F4 in FIG. 2.

The grabbing end portion 13a is opened with a through hole 14 penetrating the grabbing end portion 13a in a thickness direction. As shown by FIG. 1 and FIG. 4, bearing projected portions 13b are projected integrally from both side edges of the base wall 13 to a back side of the base wall 13 to be proximate to the grabbing end portion 13a. A shaft 15 (refer to FIG. 2 and FIG. 4) arranged on the back side of the base wall 13 is attached over to the both bearing projected portions 13b. Both end portions of the shaft 15 are pres-fitted to the bearing projected portions 13b. Further, notation 15a in FIG. 4 designates a sleeve fitted to the shaft 15.

Figure 3:
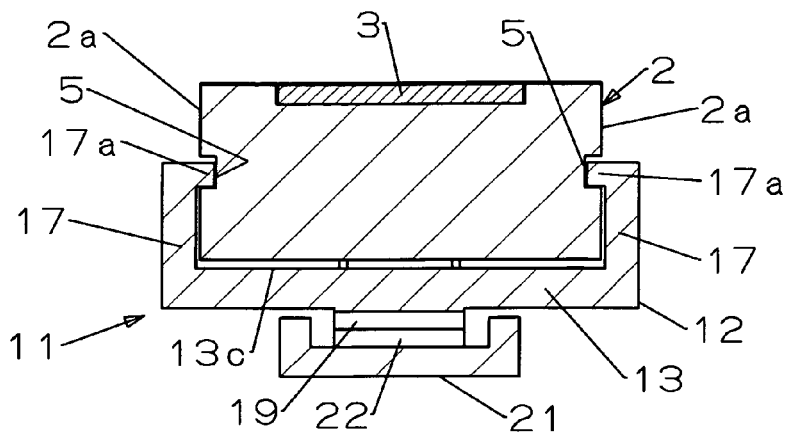
FIG. 3 is a sectional view of the portable apparatus taken along a line F3-F3 in FIG. 2.

As shown by FIG. 1 through FIG. 3, the holding portion 16 is formed by, for example, a pair of holding side walls 17 opposed to each other, and a holding end wall 18. A height of the holding side wall 17 and the holding end wall 18 is lower than a thickness of the apparatus main body 2.

The holding side walls 17 are formed to project from both side edges of the base wall 13 to surface sides and include projected streaks (projections) 17 (refer to FIG. 3) to be engaged with the engaging groove 5 at front end portions thereof. The projected streak 17a is made to function as a rail for guiding the apparatus main body 2 for being inserted to and detached from the holding portion 16. The holding side wall 17 is extended from the bearing projected portion 13b over to an end of the base wall 13 on a side opposed to the grabbing end portion 13a. End portions of the holding side walls 17 on the side of the grabbing end portion 13a are formed skewedly as shown by FIG. 1. The holding end wall 18 is projected from the opposed side of the base wall 13 to a surface side and formed over to the both holding side walls 17. The holding end wall 18 includes a projected edge 18a (refer to FIG. 2) to be engaged with the engaging groove 6 or 7 at a front end portion thereof.

As shown by FIG. 2 and FIG. 3, the main body side pinching portion 19 is formed at the back face of the base wall 13. The main body side pinching portion 19 constitutes a shape of continuous recesses and projections, preferably, a saw teeth shape.

The clip piece 21 is formed by a synthetic resin and is pivotably attached to the holder main body 12. Specifically, as shown by FIG. 4, the clip piece 21 is pivotably supported by the shaft 15 attached to the back side of the holder main body 12.

According to the clip piece 21, one end side portion thereof is made to constitute a main portion opposed to the back face of the base wall 13 and other end side portion is made to constitute a clip piece side grabbing end portion 21a by constituting a boundary therebetween by the shaft 15. The clip piece side grabbing end portion 21a is skewedly continuous to the main portion. The clip piece 21 is supported by the shaft 15 such that the clip piece side grabbing end portion 21a is arranged to be opposed to the back side of the grabbing end portion 13a of the holder main body 12.

As shown by FIG. 2 and FIG. 3, the clip piece 21 includes a clip piece side pinching portion 22. The clip piece side pinching portion 22 is made to constitute a shape of recesses and projections in correspondence with the main body side pinching portion 19, for example, a saw teeth shape.

Figure 5:
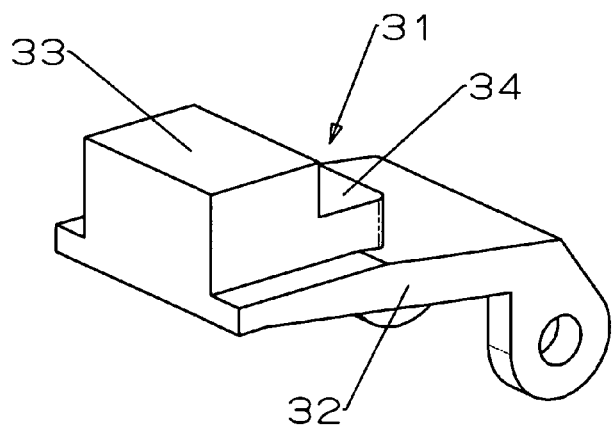
FIG. 5 is a perspective view showing a stopper member provided to the portable apparatus of FIG. 1.

The stopper member 31 is a molded product of a synthetic resin and is constituted by a part separate from the holder 11 and the clip piece 21 and is provided with a color separate from those of holder 11 and the clip piece 21 to be made to be identified easily. As shown by FIG. 5 and the like, the stopper member 31 includes an arm portion 32, and an engaging portion 33 and a pressing portion 34 formed at a free end side portion of the arm portion 32. As shown by FIG. 4, a base end portion of the arm portion 32 is supported by the shaft 15. Thereby, the stopper member 31 is pivotably attached to the holder 11 by way of the shaft 15 and is opposed to the clip piece side grabbing end portion 21a of the clip piece 21.

The engaging portion 33 is smaller than the through hole 14. The engaging portion 33 is made to come to and go from a surface 13c of the base wall 13 by passing the through hole upon being pivoted by the arm portion 32. Therefore, the grabbing end portion 13a surrounds the engaging portion 33.

In this specification, a state in which the engaging portion 33 is projected from the surface 13c of the base wall 13 is referred such that the engaging portion 33 is arranged at a restricting position, and a state in which the engaging portion 33 comes to be below being flush with the surface 13c of the base wall 13 is referred such that the engaging portion 33 is arranged at a releasing position. The engaging portion 33 arranged at the restricting position restricts the apparatus main body 2 held by the holding portion 16 as described later so as not to draw out from the holding portion 16 in a direction reverse to a direction of inserting to the holding portion 16, and the engaging portion 33 arranged at the releasing position releases such restriction.

The pressing portion 34 is formed continuously to a root of the engaging portion 33 and a height of the pressing portion 34 is lower than that of the engaging portion 33. Also the pressing portion 34 comes to and goes from the surface of the base wall 13 by passing the through hole 14 by pivoting the arm portion 32.

Figure 8:
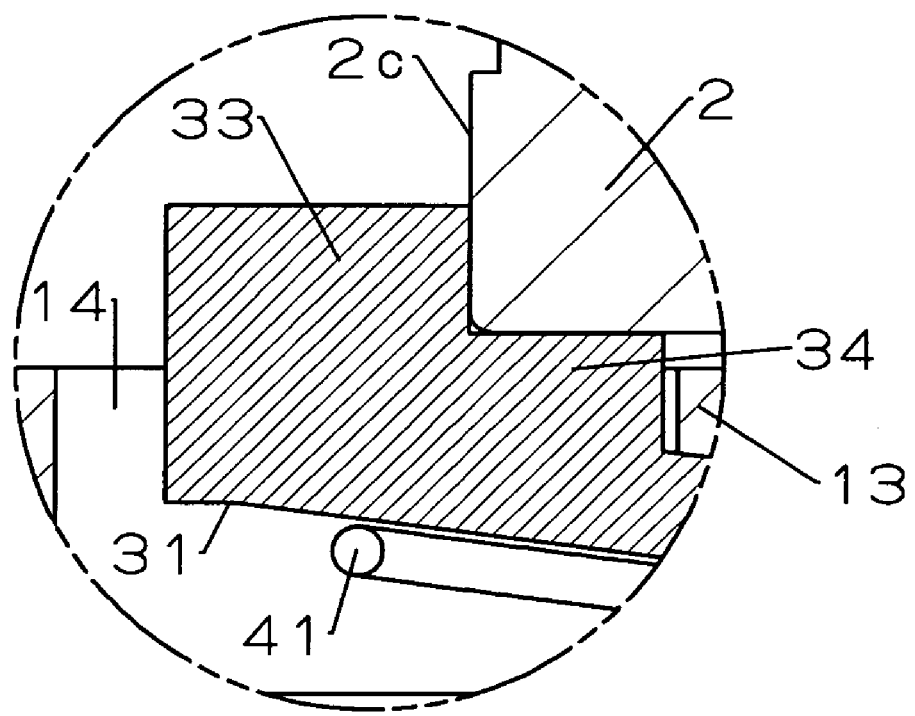
FIG. 8 is a sectional view enlarging to show F8 portion in FIG. 2.

A distance L (refer to FIG. 2) from a corner of substantially 90° made by the engaging portion 33 and the pressing portion 34 to the holding end wall 18 is equal to a total length of the apparatus main body 2. Therefore, in a state in which the apparatus main body 2 is inserted to and held by the holding portion 16, as shown by FIG. 2 and FIG. 8, the engaging portion 33 is caught by and engaged with the one end face 2b or the other end face 2c of the apparatus main body 2 and the pressing portion 34 is brought into contact with the back face of the apparatus main body 2 in the same state.

The torsional coil spring 41 is provided to be wound to the shaft 15 as shown by FIG. 4. As shown by FIG. 2, the torsional coil spring 41 urges the clip piece 21 to the holder main body 12, and specifically to the back face of the base wall 13, by bringing one end portion thereof into contact with the clip piece side grabbing end portion 21a. Further, the torsional coil spring 41 urges the stopper member 31 by bringing other end portion thereof into contact with the arm portion 32 such that the stopper member 31 is arranged at a position of being engaged with the apparatus main body 2, that is, such that the engaging portion 33 is projected from the surface 13c of the base wall 13.

According to the holder 11 of the pedometer 1 explained above, the clip piece 21 and the stopper member 31 are urged by the single torsional coil spring 41, and therefore, exclusive urging members for respectively urging the clip piece 21 and the stopper member 31 are not needed. Therefore, in accordance with reducing a number of parts constituting the holder 11 and a number of integrating steps, a constitution of the holder 11 becomes simple and fabrication cost can be reduced.

Further, by an urge force of the torsional coil spring 41, the engaging portion 33 and the pressing portion 34 of the stopper member 31 maintain a state of being projected from the surface 13c of the base wall 13 by passing the through hole 14 of the base wall 13. The state is maintained even in a state of not mounting the holder 11 to the mounted object. Therefore, the apparatus main body 2 can be held even by the holder 11 which is not mounted to the mounted object by a procedure described later. Thereby, there is no need for separately storing the apparatus main body 2 and the holder 11 when the pedometer 1 is not used, the pedometer 1 can be stored by holding the apparatus main body 2 with the holder 11, and therefore, it is easy to prevent the apparatus main body 2 and the holder 11 from being lost.

Next, the procedure of holding the apparatus main body 2 using the holder 11 will be explained.

Figure 6:
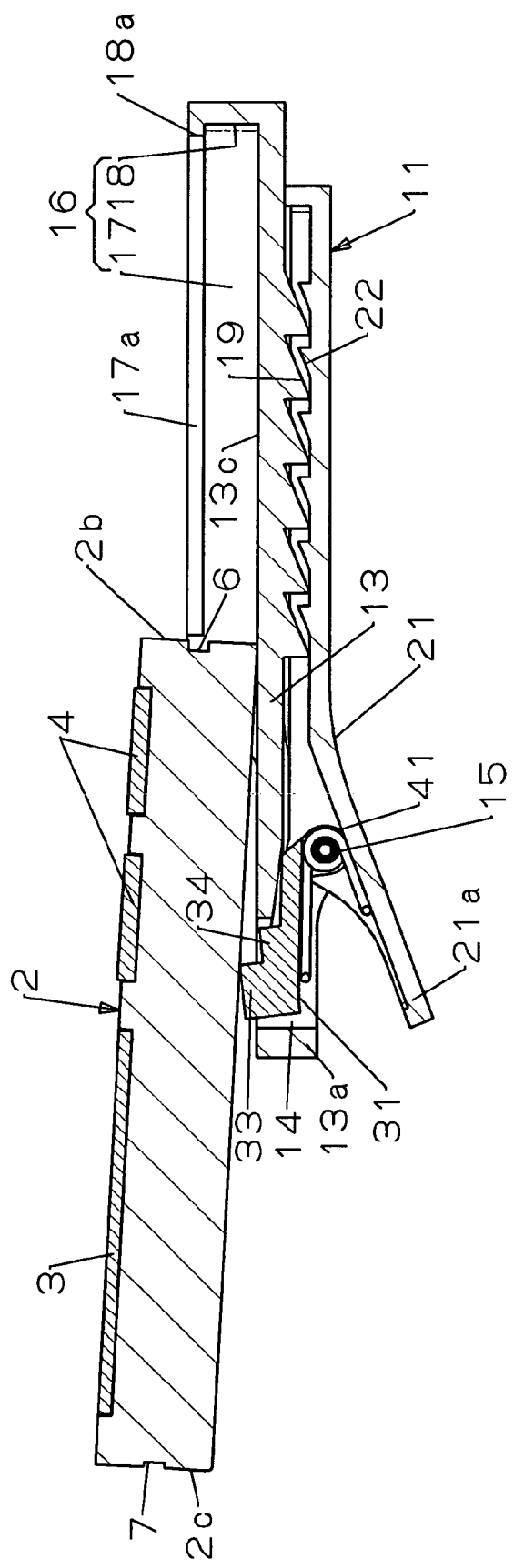
FIG. 6 is a sectional view showing the portable apparatus of FIG. 1 in a state of inserting the apparatus main body to the apparatus main body holder.

First, the apparatus main body 2 is inserted between the pair of holding side walls 17 of the holding portion 16 to slide along the surface 13c of the base wall 13 by constituting a head by either of the one end face 2b or the other end face 2c of the apparatus main body 2, for example, constituting the head by the one end face 2b as shown by FIG. 6. In this case, the apparatus main body 2 is inserted to the holding portion 16 while fitting the engaging groove 5 of the side face 2a of the apparatus main body 2 to the projected streak 17a of the holding side wall 17. By progressing the insertion, the back face of the apparatus main body 2 is brought into contact with the engaging portion 33 of the stopper member 31, and therefore, at this time point and thereafter, the stopper member 31 is pivoted such that the stopper member 31 is pressed in a direction of coming below the surface 13c of the base wall 13 against the urge force of the torsional coil spring 41.

Further, in accordance with butting a side face on a front side in a direction of inserting the apparatus main body 2, that is, the one end face 2b to the holding end wall 18 to hamper further insertion, the projected edge 18a of the holding end wall 18 and the engaging groove 6 of the one end face 2b are fitted. Simultaneously therewith, the apparatus main body 2 rides over the engaging portion 33 of the stopper member 31, and therefore, the engaging portion 33 is projected from the surface 13c of the base wall 13 by the urge force of the torsional coil spring 41 to be arranged at the restricting position.

Thereby, the engaging portion 33 is engaged with a side face on a rear side in the direction of inserting the apparatus main body 2, that is, the other end face 2c constituting the side face on a side opposed to the direction of inserting the apparatus main body 2 to the holding portion 16. Along therewith, the pressing portion 34 is brought into contact with the back face of the apparatus main body on a side of the other end face 2c. FIG. 2 shows a state in which the apparatus main body 2 is inserted to and held by the holder 11 in this way. Further, as described above, the urge force of the torsional coil spring 41 is utilized for catching the engaging portion 33 by the side face of the rear side in the direction of inserting the apparatus main body 2, and therefore, a particular operation is not needed for preventing the apparatus main body 2 from being drawn out from the holding portion 16.

In the holding state, a movement in a thickness direction of the apparatus main body 2 is restrained by engaging the projected streak 17a of the holding side wall 17 and the engaging groove 5 of the apparatus main body 2. Similarly, a movement in a width direction of the apparatus main body 2 is restrained by the holding side wall 17. Further, a movement to the front side in the direction of inserting the apparatus main body 2 is restrained by the holding end wall 18, and a movement to the rear side in the direction of inserting the apparatus main body 2, in other words, a movement in a direction of drawing out the apparatus main body 2 from the holding portion 16 is restrained by the engaging portion 33 of the stopper member 31.

Further, the apparatus main body 2 is pinched by the holding end wall 18 and the engaging portion 33 of the stopper member 31 from the longitudinal direction by the urge force of the torsional coil spring 41, and therefore, the apparatus main body 2 can be held so as not to be rattled in the longitudinal direction. Further, by the urge force of the torsional coil spring 41, the pressing portion 34 brought into contact with the back face of the rear side in the direction of inserting the apparatus main body 2 presses the apparatus main body 2 in a direction of separating from the surface 13c of the base wall 13, and therefore, the apparatus main body 2 is pinched in the thickness direction by a portion of engaging the projected streak 17a of the holding side wall 17 and the engaging groove 5 of the apparatus main body 2 and the pressing portion 34. Therefore, the apparatus main body 2 can be held so as not to be rattled in the thickness direction. Therefore, a function of holding the holder 11 relative to the apparatus main body 2 is excellent.

Figure 7:
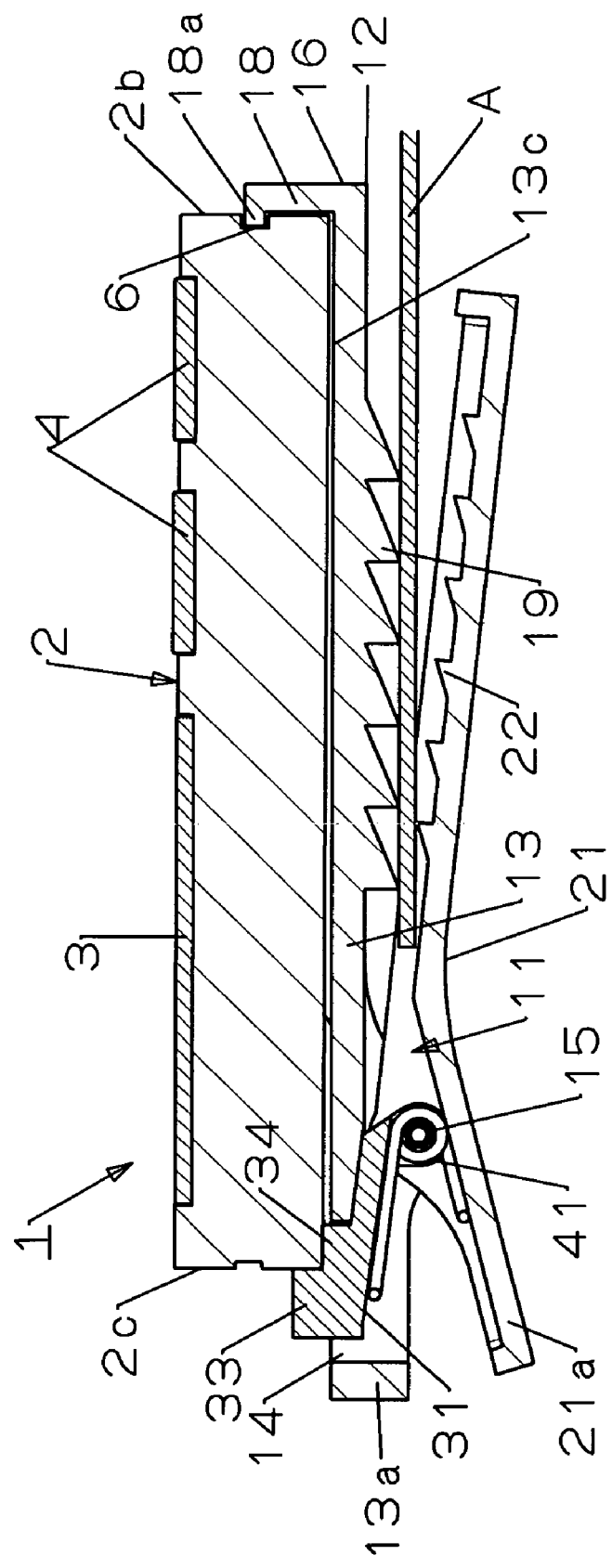
FIG. 7 is a sectional view showing the portable apparatus of FIG. 1 in a state of being mounted to a mounted object.

When the apparatus main body 2 held by the holder 11 is carried by being mounted to a mounted object A (refer to FIG. 7), the clip piece 21 may be opened and closed relative to the holder main body 12 by touching the finger to the grabbing end portion 13a of the holder main body 12 and the clip piece side grabbing end portion 21a of the clip piece 21 to pinch the mounted object A therebetween. FIG. 7 shows a state of mounting the pedometer 1 to the mounted object A.

In the mounting state, the urge force of the torsional coil spring 41 is increased in accordance with a thickness of the mounted object A. Therefore, a state of holding the apparatus main body 2 relative to the holding portion 16 can further be stabilized. Along therewith, regardless of the thickness of the mounted object A, a reliability of holding the apparatus main body 2 at the holding portion 16 is not deteriorated, and therefore, a concern of detaching the apparatus main body 2 from the holding portion 16 in carrying the holding portion 16 can be resolved. Therefore, it is not necessary to increase a margin of engaging the engaging portion 33 with the apparatus main body 2 in consideration of a reduction in a holding force, further, to increase the urge force in accordance therewith, and therefore, an operation performance of attaching and detaching the apparatus main body 2 to and from the holding portion 16 is not deteriorated.

The surface of the apparatus main body 2 held by the holding portion 16 is exposed from the holder 11 in carrying or not carrying the pedometer 1. Therefore, the operation of the operating portion 4 and optical recognition of the display 3 at the surface of the apparatus main body 2 can easily be carried out.

Meanwhile, the base wall 13 includes the grabbing end portion 13a disposed to be orthogonally continuous to the other end face 2c by constituting a reference by the other end face 2c constituting a side face on a rear side in the direction of inserting the apparatus main body 2 held by the holding portion 16. Therefore, the pedometer 1 can be operated to attach and detach to and from the mounted object A by touching the finger to the grabbing end portion 13a and the clip piece side grabbing end portion 21a opposed to each other as described above.

Thereby, attaching and detaching operation is not obliged to carry out by touching the finger to the clip piece side grabbing end portion 21a and the held apparatus main body 2, and therefore, the surface of the apparatus main body 2 can be prevented from being pressed. Therefore, the display 3 of the apparatus main body 2 is restrained from being stained by the finger. Further, when the apparatus main body 2 is held by the holding portion 16 by constituting the head by the other end face 2c conversely to FIG. 2, the apparatus main body 2 can be restrained from being operated erroneously by unpreparedly pressing the operating portion 4 of the apparatus main body 2.

Further, the grabbing end portion 13a includes the through hole 14 through which the engaging portion 33 passes and surrounds the engaging portion 33, and therefore, other object can be restrained from being brought into contact with the engaging portion 33 by the grabbing end portion 13a in carrying or storing the pedometer 1. Thereby, the apparatus main body 2 can be prevented from being detached from the holding portion 16 by releasing the apparatus main body 2 from being caught by the engaging portion 33 in accordance with pressing down the engaging portion 33 unpreparedly.

In the holder 11 of the above-described constitution, the stopper member 31 for preventing the apparatus main body 2 inserted to the holding portion 16 from being drawn out to a side opposed to the direction of inserting the apparatus main body 2 inserted to the holding portion 16 is a part separate from the holder main body 12 and the clip piece 21. Therefore, in comparison with a case of providing a constitution in correspondence with the stopper member 31 integrally with the holder main body 12 or the clip piece 21, the stopper member 31 can be optimized to form without being restricted by a material or a strength of the holder main body 12 or the clip piece 21. In accordance therewith, the stopper member 31 can also be made by a material of a color different from that of the holder main body 12, and in this case, the stopper member 31 is easy to be recognized optically, and therefore, an operability can be promoted. Further, the stopper member 31 is attached to the shaft 15, and therefore, a reliability of an operation of moving over to the restricting position and the releasing position is high.

Further, according to the pedometer 1 of the above-described constitution, the engaging portion 33 of the stopper member 31 for restraining the apparatus main body 2 from being drawn out from the holding portion 16 is arranged at the restricting position by being projected from the surface 13c of the base wall 13. Therefore, a carrying person will recognize the engaging portion 33, and therefore, an operability in a case of moving the engaging portion 33 to the releasing position below the surface 13c of the base wall 13 by pushing the engaging portion 33 is excellent. Further, an engaged portion of the apparatus main body 2 engaged with the engaging portion 33 arranged at the restricting position is constituted by the side face of the rear side in the direction of inserting the apparatus main body 2 to the holding portion 16 (other end face 2c), and therefore, it is not necessary to particularly provide an engaged portion constituted by a hole, a stepped portion or the like at the apparatus main body 2. Thereby, a design of the apparatus main body 2 is not restricted by a relationship with the engaging portion 33.

Figure 9:
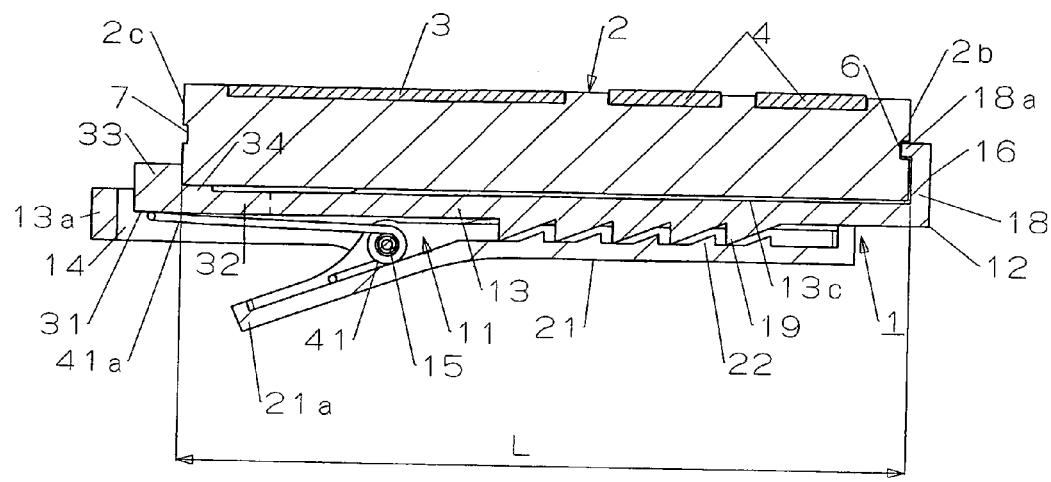
FIG. 9 is a sectional view showing a portable apparatus according to a second embodiment of the invention in a state of holding an apparatus main body thereof by an apparatus main body holder.
Figure 10:
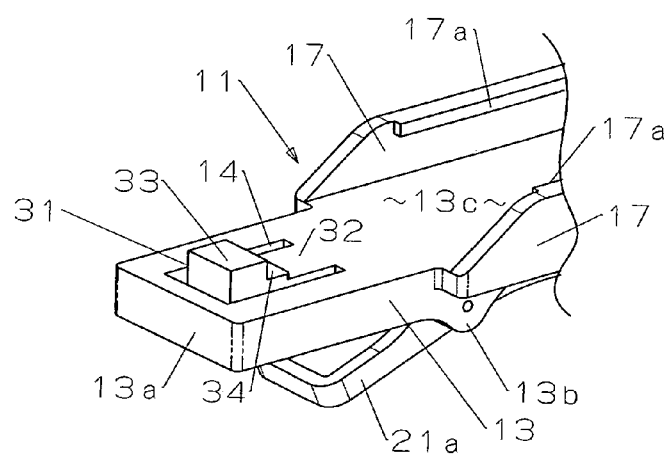
FIG. 10 is a perspective view showing a one end portion of the apparatus main body holder of the portable apparatus of FIG. 9.

A second embodiment of the invention will be explained in reference to FIG. 9 and FIG. 10. The second embodiment is the same as the first embodiment except an item explained below. Therefore, constitutions the same as those of the first embodiment are attached with the same notations and an explanation thereof will be omitted, and an explanation will be given of the item different from that of the first embodiment as follows. The second embodiment differs from the first embodiment in the construction of the stopper means.

That is, the stopper means 31 is integrally provided to a side of the grabbing end portion 13a of the base wall 13. The root of the arm portion 32 of the stopper means 31 is integrally communicated with the base wall 13, the stopper means 31 can flexibly be deformed to pivot by constituting a fulcrum by the root, thereby, the engaging portion 33 of the stopper means 31 is projected from the surface 13c of the base wall 13 and comes to be below the surface 13c by being pressed by the back side of the base wall 13. The through hole 14 provided at the base wall 13 surrounds the stopper means 31 except the root of the arm portion 32. Further, the one end portion 41a of the torsional coil spring 41 is brought into contact with the back face of the arm portion 32 and the stopper means 31 is urged in a direction of projecting the engaging portion 33 from the surface 13c of the base wall 13. Further, according to the embodiment, a devise of, for example, thinning a wall thickness around the root of the arm portion 32 can be adopted in order to further facilitate to flexibly deform the arm portion 32. The second embodiment is the same as the first embodiment except the item explained above.

Therefore, also in the pedometer 1 of the second embodiment, the problem of the invention can be resolved by the reasons already explained in the first embodiment. Further, according to the second embodiment, the stopper means 31 is integrally provided with the base wall 13 of the holder 11, and therefore, the stopper means 31 need not be formed separately from the holder main body. Therefore, an advantage in further reducing the number of parts and the number of steps of integrating the holder 11 is achieved.

Further, according to the second embodiment, the invention can also be carried out by arranging the one end portion 41a of the torsional coil spring 41 so as not to be opposed to the stopper means 31 integrally formed with the base wall 13. In this case, the stopper means 31 is arranged at the restricting position of being projected from the surface 13c of the base wall 13 by passing the through hole 14 normally by its own flexibility, and is arranged at the releasing position below the surface 13c upon bending by being pressed.

The problem of the invention can be resolved even when the invention is carried out in such a mode. That is, the stopper means 31 can be moved to the restricting position and the releasing position by its own flexibility, and therefore, an urging member for urging the stopper means 31 to the restricting position can be omitted. Therefore, as the urging member, only one torsional coil spring 41 for urging the clip piece 21 is needed. In this way, exclusive urging members for respectively urging the stopper means 31 and the clip piece 21 are not needed, and therefore, the construction can be simplified by reducing the number of parts.

Further, the urge force of the torsional coil spring 41 is presented regardless of arranging the stopper means 31 at the restricting position. Therefore, even when the holder 11 is not mounted to the mounted object, the apparatus main body 2 can be held with a high reliability so as not to be detached from the holding portion 16. Furthermore, the stopper means 31 can be arranged properly at the restricting position regardless of the thickness of the mounted object, and therefore, even when the holder 11 is mounted to the mounted object, the apparatus main body 2 can be held with high reliability so as not to be detached from the holding portion 16.

Figure 11:
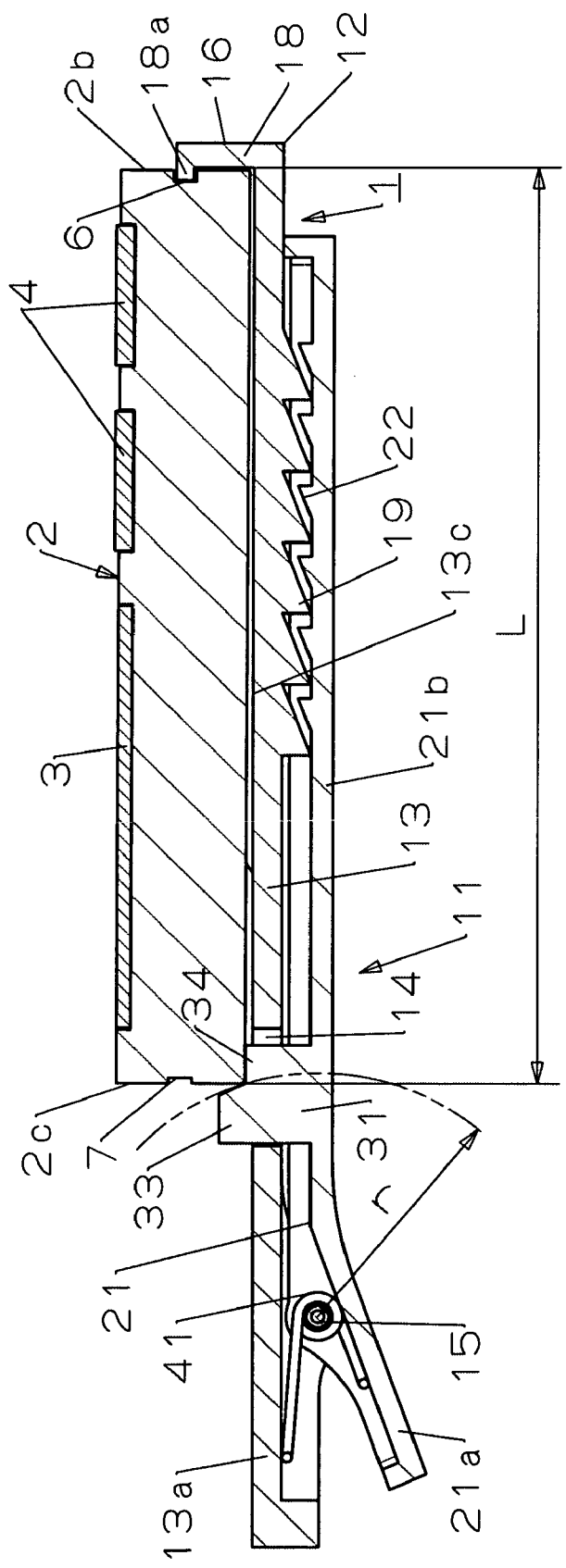
FIG. 11 is a sectional view showing a portable apparatus according to a third embodiment of the invention in a state of holding an apparatus main body thereof by an apparatus main body holder.
Figure 12:
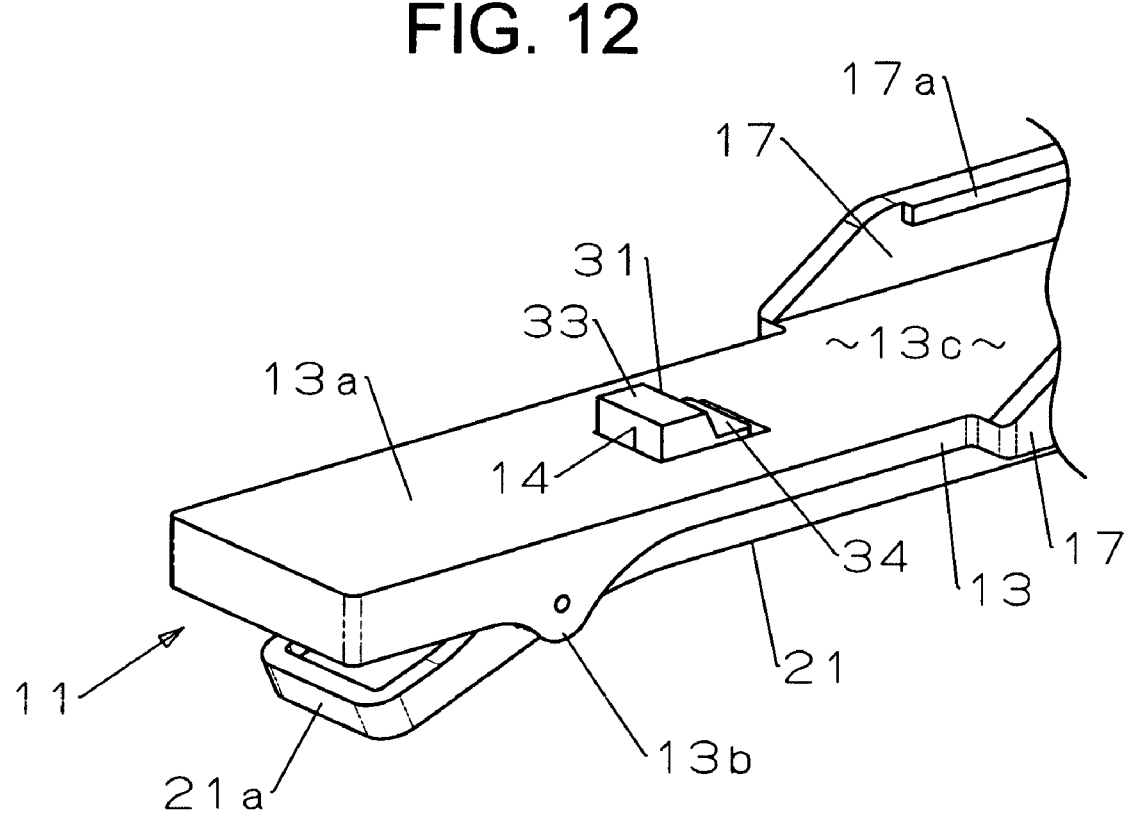
FIG. 12 is a perspective view showing one end portion of the apparatus main body holder of the portable apparatus of FIG. 11.

A third embodiment of the invention will be explained in reference to FIG. 11 and FIG. 12. The third embodiment is the same as the first embodiment except an item explained below. Therefore, constitutions are the same as those of the first embodiment are attached with the same notations and an explanation thereof will be omitted, and an explanation will be given of an item different from that of the first embodiment as follows. The third embodiment differs from the first embodiment in the constitution of the stopper means.

That is, the stopper means 31 is provided integrally with a main portion 21b of the clip piece 21. The stopper means 31 is passed through the through hole 14 of the base wall 13. Further, the arm portion of the stopper means explained in the first embodiment is carried by a portion of the main portion 21b from the shaft 15 to the engaging portion 33 in FIG. 11. A side face of the engaging portion 33 on the side the pressing portion 34 provided to the stopper means 31 is formed by a shape of an arc drawn by a radius r centering on the shaft 15. Thereby, when the stopper means 31 goes in and comes out from the surface 13c of the base wall 13, the stopper means 31 is made to be able to operate to go in and come out from the surface 13c of the base wall 13 by avoiding an interference of the stopper means 31 with the side face of the rear side in the direction of inserting the apparatus main body 2 held by the holding portion 16 (other end face 2c in FIG. 11). The third embodiment is the same as the first embodiment except the item explained above.

Therefore, even in the pedometer 1 of the third embodiment, the problem of the invention can be resolved by the reason already explained in the first embodiment. Further, according to the third embodiment, the stopper means 31 is provided integrally with the clip piece 21, and therefore, the stopper means 31 need not be formed separately from the clip piece 21. Therefore, an advantage of further reducing the number of parts and the number of steps of integrating the holder 11 is achieved.

Further, the invention is not restricted by the respective embodiments. For example, the invention can be carried out by omitting a portion in correspondence with the holder main body holding end portion in the respective embodiments.

What is claimed is:

1. An apparatus main body holder for detachably holding a main body of a portable apparatus, the apparatus main body holder comprising:
    a holder main body comprised of a base wall and a holding portion provided on a surface side of the base wall for detachably and slidingly receiving and holding a main body of a portable apparatus on a surface of the base wall, the surface of the base wall having a through-hole, and the holding portion having a pair of sidewalls and an end wall extending between the sidewalls and configured to engage the main body of the portable apparatus when the main body is fully received by the holder main body;
    a clip piece pivotably attached to the holder main body;
    a stopper member movably disposed within the through-hole of the base wall for undergoing movement between a restricting position in which the stopper member projects from the surface of the base wall and is configured to engage and securely hold the main body of the portable apparatus on the holding portion so that the main body of the portable apparatus is only partially disposed over the through-hole of the base wall in a state in which the main body of the portable apparatus is fully received by the holder main body, and a releasing position in which the stopper member extends into the through-hole and does not project from the surface of the base wall so that the main body of the portable apparatus is allowed to be slid relative to the holding portion; and
    an urging member for urging the clip piece into contact with the holder main body and for urging the stopper member to the restricting position.

2. An apparatus main body holder according to claim 1; wherein the stopper member is configured to be engaged with a portion of the main body of the portable apparatus when the stopper member is in the restricting position and to be disengaged from the portion of the main body of the portable apparatus when the stopper member is in the releasing position.

3. An apparatus main body holder according to claim 1; wherein the clip piece and the urging member are arranged on a rear side of the holder main body and the clip piece is urged into contact with a rear surface of the holder main body by the urging member.

4. An apparatus main body holder according to claim 1; wherein the stopper member is formed by a part separately from the holder main body and the clip piece, and the stopper member is rotatably attached to the holder main body by way of a shaft.

5. An apparatus main body holder according to claim 1; wherein the stopper member is formed integrally with the holder main body.

6. An apparatus main body holder according to claim 1; wherein the stopper member is formed integrally with the clip piece.

7. An apparatus main body holder according to claim 1; wherein the stopper member has an engaging portion configured to be engaged for moving the stopper member into the through-hole to position the stopper member from the restricting position to the releasing position.

8. An apparatus main body holder according to claim 7; wherein the stopper member has a pressing portion for contacting a surface portion of the main body of the portable apparatus when the stopper member is in the restricting position.

9. An apparatus main body holder according to claim 1; wherein the through-hole is formed at a first grabbing end portion of the holder main body configured to be grabbed by a user of the apparatus main body holder for moving the stopper member into the through-hole to position the stopper member from the restricting position to the releasing position.

10. An apparatus main body holder according to claim 9; wherein the grabbing end portion of the holder main body is disposed at an end portion of the base wall; and wherein the clip piece has a second grabbing end portion arranged on a rear side of the holder main body opposite to the first grabbing end portion of the holder main body and configured to be grabbed by the user of the apparatus main body holder together with the first grabbing end portion of the holder main body.

11. A portable apparatus comprising:
an apparatus main body provided with an operating portion and a display on a surface thereof; and
an apparatus main body holder according to claim 1 for insertably and detachably holding the apparatus main body.

12. A portable apparatus according to claim 11; wherein the operating portion and the display of the apparatus main body are exposed in a state in which the apparatus main body is held by the holding portion of the apparatus main body holder.

13. A portable apparatus according to claim 12; wherein the apparatus main body has parallel side surfaces provided with engaging grooves extending in a direction in which the apparatus main body is inserted to and detached from the apparatus main body holder;
and wherein the holding portion of the holder main body has a pair of side wall portions opposed to each other and each extending from the surface of the base wall to a height lower than a height of the corresponding side surface of the apparatus main body, an end wall interconnecting the side wall portions, and projecting portions extending from the respective side wall portions for engaging the respective engaging grooves of the apparatus main body.

14. A portable apparatus according to claim 11; wherein the base wall of the holder main body has a first grabbing end portion configured to be grabbed by a user of the portable apparatus, the through-hole of the base wall being formed in the first grabbing end portion; and wherein the clip piece has a second grabbing end portion arranged on a rear side of the holder main body opposite to the first grabbing end portion of the holder main body and configured to be grabbed by the user of the apparatus main body holder together with the first grabbing end portion of the holder main body.

15. An apparatus according to claim 11; wherein the stopper member is formed as a part separate and independent from the holder main body and the clip piece.

16. An apparatus according to claim 11; wherein the stopper member is formed in one piece with the holder main body.

17. An apparatus according to claim 11; wherein the stopper member is formed in one piece with the clip piece.

18. An apparatus main body holder comprising:
a holder main body having a base wall and a holding portion extending from the base wall for detachably holding a main body of a portable apparatus;
a clip piece pivotably attached to the holder main body;
a stopper member formed separately from each of the holder main body and the clip piece and mounted for undergoing movement between a first position in which the stopper member is configured to engage the main body of the portable apparatus to securely attach the main body on the holding portion of the holder main body and a second position in which the stopper member is not configured to engage the main body of the portable apparatus so that the portable apparatus is allowed to be detached from the holder main body; and
an urging member for urging the stopper member to the first position and for urging the clip piece into contact with the holder main body.

19. An apparatus main body holder according to claim 18; wherein the base wall of the holder main body has a through-hole that receives the stopper member and allows the stopper member to undergo movement between the first and second positions.

20. A holder for holding a portable device, the holder comprising:
a main body comprised of a base wall having side edges and first and second opposite end portions, a pair of side walls each having first and second ends and projecting from the respective side edges of the base wall to form with the base wall a cavity for receiving a portable device, and an end wall extending between the second ends of the side walls at the second end portion of the base wall to form a closed end of the main body for contacting the portable apparatus in a state in which the portable device is fully inserted within the cavity, the first end portion of the base wall having a through-hole and extending from the first ends of the side walls toward an open end of the main body through which the portable device is inserted into or released from the cavity; and
a stopper member movably disposed within the through-hole of the base wall for undergoing movement between a restricting position in which the stopper member projects from a surface of the base wall and restricts movement of the portable device toward the open end of the main body in a state in which the portable device is fully inserted within the cavity, and a releasing position in which the stopper member extends into the through-hole and does not project from the surface of the base wall to allow the portable device to be released from the cavity through the open end of the main body.

21. A holder according to claim 20; further comprising an urging member for urging the stopper member to the restricting position.

22. A holder according to claim 20; further comprising a clip pivotally mounted to the main body for securing the holder to an article.

23. A holder according to claim 22; further comprising an urging member for urging the stopper member to the restricting position and for urging the clip into contact with the base wall.

24. A holder according to claim 22; wherein the stopper member is formed as a part separate and independent from the main body and the clip.

25. A holder according to claim 22; wherein the stopper member is formed in one piece with the clip.

26. A holder according to claim 20; wherein the stopper member is formed in one piece with the main body.

27. An apparatus comprising:
a portable device comprised of a main body having a pair of side surfaces provided with respective grooves; and
a holder according to claim 20 for holding the portable device within the cavity of the holder main body, the side walls of the main body having projections for engagement with the respective grooves of the portable device to guide the portable device during insertion and release of the portable device into and from the cavity of the holder main body.

* * * * *